Nov. 30, 1943.    C. T. OSTERBERG    2,335,693
POSTAGE CHECKER
Filed March 31, 1943
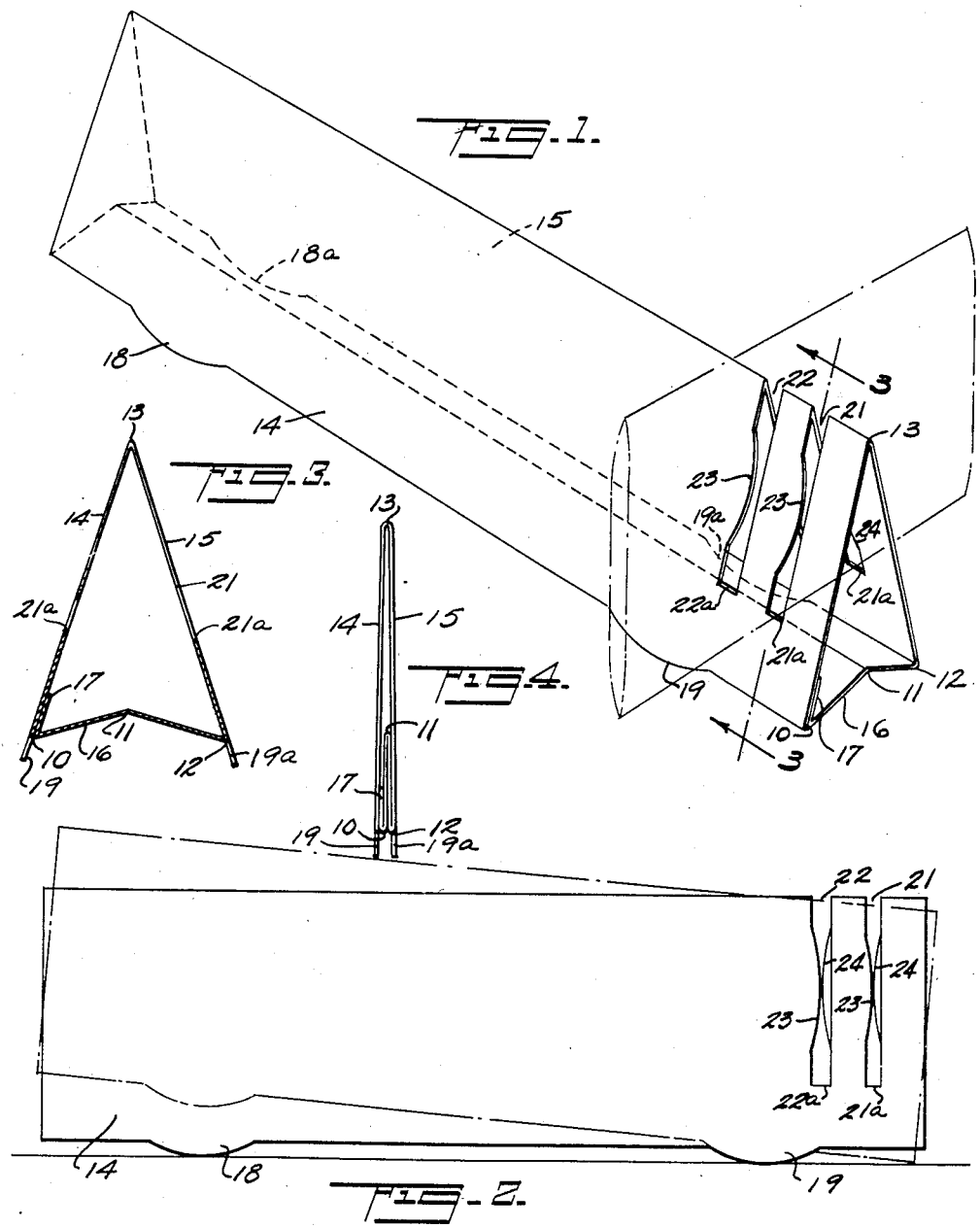
INVENTOR
Carl T. Osterberg
BY
Edwin H. Owen
ATTORNEY Patented Nov. 30, 1943

2,335,693

UNITED STATES PATENT OFFICE 2,335,693

POSTAGE CHECKER

Carl T. Osterberg, Milwaukee, Wis., assignor to Pitney-Bowes Postage Meter Company, Stamford, Conn., a corporation of Delaware Application March 31, 1943, Serial No. 481,205

4 Claims. (Cl. 265—49)

This invention relates to a device for checking the weight of letters.

It is the principal object of this invention to provide a scale beam which is adapted to stand upright and rigidly upon a desk or other flat surface for use in displaying advertising or other matter, and which, by a novel arrangement, is adapted to support a letter in an upright position within a vertically slotted portion thereof for the purpose of checking the weight of same to determine the rate of postage at which the letter is mailable. If for instance, a letter placed in one slot weighs slightly more than one ounce, the beam will tip about the supporting feet nearest the letter slot, thus indicating that postage in excess of the one ounce rate is required, whereas if the weight of the letter were less than one ounce, the beam would rigidly support the letter without tipping, to indicate that the one ounce postage rate would be sufficient.

It is a further object to provide a tubular scale beam of substantially triangular cross section which is adapted to be collapsed to a flat condition for purposes of mailing or storing, and when opened to an operative triangular formation, is adapted to support a letter in a vertical position within a slotted portion thereof to check the weight of said letter.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawing, wherein:

Fig. 1 shows a perspective view of the device set up in an operative position and having a letter supported within one of the slots thereof, as indicated in dot dash lines;

Fig. 2 is a side elevational view of the device as seen in Fig. 1, and includes a dot dash position which illustrates the position to which the beam will tip when a letter, which is heavier than the normal weight required, is inserted within one of the slots;

Fig. 3 is a cross sectional view of the beam taken along the line 3—3 of Fig. 1; and Fig. 4 is an end elevational view showing the device collapsed.

The device is adapted to be die cut from sheet material and is folded as at 10, 11, 12 and 13, to produce a substantially triangular tube of isosceles formation. Two spacious walls are provided by the sides of the triangle at 14 and 15, and the base 16 thereof is adapted to be folded inwardly, as shown in Fig. 4, for convenience in mailing as a flat article or for storing purposes.

When folded in a tubular triangular formation the free ends of the device may be joined together by gluing the lower portion of wall 14 to a short flange portion 17 running the length of the device, or in any other convenient manner.

Pairs of feet are provided at 18—18a and 19—19a, at the lower edges of the walls 14 and 15, and at a predetermined distance in from each end of the beam. The feet 19—19a will be referred to as the pivot feet.

At predetermined distances between the vertical axes of the pivot feet 19—19a and the end of the wall to the right thereof, as viewed from Figs. 1 and 2, vertically disposed slots 21 and 22 are provided. Said slots pass through the apex of the triangular tube structure and terminate at 21a—21a and 22a—22a to provide seat portions for the support of the lower edge of a letter. If desired, projecting wing portions may be provided, as at 23—23 and 24—24 to assist in centering a letter within either of the slots 21 or 22.

When the device is set up, the feet 18—18a and 19—19a are adapted to rest firmly upon the flat surface of a supporting member, as in Fig. 2, to thus normally support the beam in a horizontal position. By means of the arrangement of the letter supporting slots 21 and 22, a letter is adapted to be conveniently inserted for checking the weight thereof without providing for any preadjustment of the scale beam.

In the device illustrated, the slot 21 is positioned to check one ounce mail and the slot 22 is positioned to check two ounce mail. Assuming that a letter to be checked weighs slightly greater than one ounce and is inserted in the slot 21 in the manner indicated by the dot dash position of the letter in Fig. 1. Upon releasing the letter, the beam will tip about the pivot feet 19—19a, to the dot and dash position shown in Fig. 2, thus indicating that the letter is overweight and cannot be mailed at the one ounce rate, but instead will require postage for the two ounce letter rate. If, however, a letter slightly less than one ounce were inserted in the slot, as indicated in Fig. 1, the beam would continue to rest in its normal horizontal position on all four feet, thus indicating that the rate of postage required would be the one ounce rate. By this same method a two ounce letter may also be checked in the letter slot 22.

By means of the device above described, a novel form of postage checker is provided which is ready for instant use, and said device provides a convenient way of settling the uncertainty which often exists when one has a letter to mail which is close to the one or two ounce limit, yet cannot be accurately determined by balancing it in one's hand.

Incidental to the novel features of the device as a postage checker, it is also adapted to display any desired information, such as postal rules and rates or advertising matter, over its two broad surfaces 14 and 15 between the slot 22 and left end of the device as viewed from Fig. 1. Hence the dual function for use as an advertising medium as well as providing the very practical use of a postage checker, provides an article of considerable merit.

Having described the invention, what is claimed is:

1. A postage checking device comprising a tubular beam having feet to support same in a horizontal position on a flat base, a pivotal portion provided by feet positioned near one end of said beam, said beam having a transverse slot therein forming vertically disposed and spaced walls and including a seat whereby a letter is supported in a vertical position above and to one side of said pivotal portion, and whereby, when the weight of a letter inserted within said slot portion, postage of one value will be required, but does not cause the beam to rock about its pivotal if the beam rocks about said pivotal portion, postage of a greater value will be required.

2. A postage checking device comprising a tubular beam of substantially isosceles triangular cross-section, feet positioned along the lower surface of the base of said beam to support same in a horizontal position, certain of said feet being positioned at a predetermined distance from one end of said beam to provide a pivot about which the beam may rock, the side walls of said triangular beam having a vertical slot cut a predetermined distance downwardly through the vertex thereof between the vertical pivotal axis and the last mentioned beam end, whereby a letter may be inserted and supported in a vertical position to check the weight thereof, and whereby, when the weight of the letter does not cause the beam to rock about its pivot feet, postage of one value will be required, but if the beam rocks about said pivot feet, postage of a greater value will be required.

3. A postage checking device comprising a tubular beam of substantially isosceles triangular cross-section, feet projecting from the lower side edges of the base thereof to support same in a horizontal position, two of said feet being positioned at a predetermined distance from one end of said beam and being curved to provide a pivot about which the beam may be rocked, the side walls of said triangular beam having vertical transverse slots cut a predetermined distance downwardly through the vertex thereof between the vertical pivotal axis and the last mentioned beam end, whereby a letter may be inserted and supported in a vertical position to check the weight thereof, and whereby, when the weight of the letter does not cause the beam to rock about its pivot feet, postage of one value will be required, but if the beam rocks about said pivot feet, postage of a greater value will be required.

4. A postage checking device comprising a tubular beam of substantially isosceles triangular cross-section, feet projecting from the lower side edges of the base thereof to support same in a horizontal position, two of said feet being positioned at a predetermined distance from one end of said beam to provide a pivot about which the beam may be rocked, a central longitudinal fold provided in the base of said tubular beam to permit said beam to be collapsed to a substantially flat condition, the side walls of said beam having vertical transverse slots cut therethrough from the vertex to a predetermined position above the base, said slots being longitudinally located between the vertical pivotal axis and the last mentioned beam end, whereby a letter may be inserted and supported in a vertical position to check the weight thereof, and whereby, when the weight of the letter does not cause the beam to rock about its pivot feet, postage of one value will be required, but if the beam rocks about said pivot feet, postage of a greater value will be required.

CARL T. OSTERBERG.

CERTIFICATE OF CORRECTION.

Patent No. 2,335,693.  November 30, 1943.

CARL T. OSTERBERG.

It is hereby certified that error appears in the printed specification of the above numbered patent requiring correction as follows: Page 2, first column, line 34, strike out "does not cause the beam to rock about its pivotal" and insert the same after "slot" in line 32; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.